May 31, 1966 R. F. WOODCOCK ETAL 3,253,896
METHOD OF MAKING GLASS CLAD ENERGY-CONDUCTING FIBERS
Original Filed Feb. 2, 1960 2 Sheets-Sheet 2

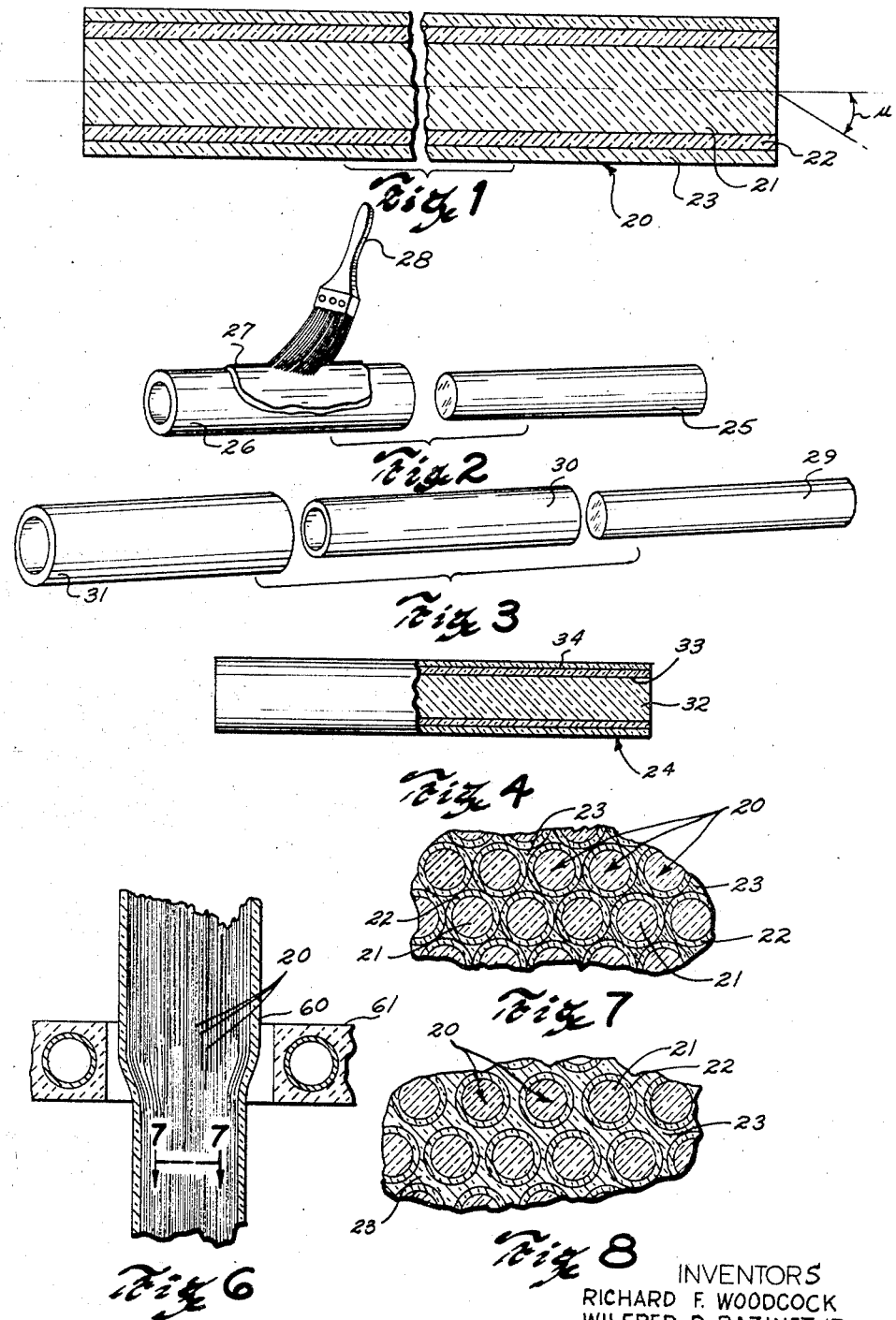

INVENTOR
RICHARD F. WOODCOCK
WILFRED P. BAZINET, JR.
BY
ATTORNEY

United States Patent Office 3,253,896
Patented May 31, 1966

3,253,896
METHOD OF MAKING GLASS CLAD ENERGY-CONDUCTING FIBERS
Richard F. Woodcock, South Woodstock, Conn., and Wilfred P. Bazinet, Jr., Webster, Mass., assignors to American Optical Company, Southbridge, Mass., a voluntary association of Massachusetts
Original application Feb. 2, 1960, Ser. No. 6,136. Divided and this application Sept. 16, 1963, Ser. No. 308,998
5 Claims. (Cl. 65—3)

This is a division of application Serial No. 6,136 filed February 2, 1960, and now abandoned.

This invention relates to improvements in light-conducting fibers and has particular reference to devices formed therefrom and method of making same.

While light-conducting fibers have been constructed of various different materials, glass fibers, particularly those formed of optical glasses, have been generally considered to be the most desirable in the manufacture of light or image-transferring devices and it will become apparent hereinafter that this invention relates more particularly to the making of glass light-conducting fibers and devices formed therefrom.

If glass fibers are gathered into a compact orderly array, they will transmit an image by breaking it up into separate components and these components are transmitted independently from one end of the array to the other. However, when two glass fibers come within a distance of approximately a half wavelength of light of each other, some light will leak from one fiber to the next and thereby cause a deterioration of the definition of the composite image. Consequently, it has been a practice to insulate one fiber from another by a relatively thin jacket of transparent material whose index of refraction is lower than that of the fiber.

Heretofore, devices embodying an intimate assembly of a plurality of individually insulated light-conducting fibers in side-by-side relation with each other were fabricated by placing bonding materials such as epoxy resins or other suitable adhesives between the fibers to secure the fibers together and at the same time to fill in voids between the individual fibers. In this way, assemblies were made which were suitable for certain limited uses. However, the above technique left much to be desired since shrinkage and the effects of aging of the bonding materials often, after periods of storage or use, caused a weakening of the structure as well as distortion thereof and in one way or another tended to eventually render the structures pervious to air and gases or otherwise unsuitable for use.

In view of the need for a more permanent and stronger structure which would be adaptable for use as a light-conducting face plate or light-coupling device or the like on pressurized or vacuumized electron tubes, for example, another technique involved the fusing together of the fibers by heating them at least to a temperature sufficient to render the claddings thereof fusible. If the fibers are lightly fused, that is, only along their initially engaging edge portions, little distortion of their cladding or general cross-sectional shape results and no evident impairment of their light-transmitting properties occurs. However, it is extremely difficult, and in most cases practically impossible when using relatively small fibers, to arrange a group of such fibers in perfect interfitting side-by-side relation with each other regardless of their initial preselected cross-sectional shapes. Therefore, voids between the individual fibers of the array are usually unavoidable unless, during the fusing operation, the fibers are compacted by forces tending to distort their cross-sectional shapes and thus literally squeeze them into compact interfitting side-by-side relation with each other.

Voids between the fibers of fused bundles are, more often than not, objectionable, as mentioned above, particularly when the bundles are used in the fabrication of face plates for use with pressurized or vacuumized articles wherein a secure, hermetically sealed structure is absolutely required. Thus, in instances where such vacuum-tight structures are needed, it has been necessary heretofore to use structures in which the fibers were compacted under force into more or less distorted interfitting relation with each other.

In such cases, a distortion of the cross-sectional shape of the fiber as a whole and thinning of the individual fiber claddings at various locations along the length of the fibers often occurs with the result that at said locations, the light-conducting core parts of the fibers may come together within a distance such as to permit leakage of light between the fibers.

It is well-known that distorted or irregularly shaped light-conducting fibers have poorer light-transmitting properties than fibers of uniform cross-sectional shapes and dimensions. In fact, fibers which are circular in cross-section have the best transmission properties mainly for the reason that the continuous uninterrupted cylindrical interface between the core and cladding parts thereof provides means by which substantially total internal reflection of all light rays entering circular fibers from all directions within the light-aperture angle of the fiber will take place throughout the length of the fiber. In fibers having irregularly shaped interfaces, many light rays passing therethrough strike the various points of interfacial irregularity at angles beyond the critical angle of reflection and thus are not internally reflected but pass outwardly through the sides of the fibers.

In overcoming the difficulties and drawbacks of the above-discussed procedures relating to the fabrication of fiber optical devices, the present invention has for its principal object, the provision of novel and improved light-conducting fibers having means thereon by which said fibers may be intimately and securely fused together in any desired aligned relation with each other without distortion of their cross-sectional shapes and method of making such fibers and devices formed therefrom.

Another object is to provide light-conducting fibers having double claddings thereon, one cladding being superimposed upon the other wherein the innermost of said claddings is of such preselected index of refraction as to provide light-insulating means for said fiber and the outermost of said claddings will serve as means to connect a plurality of said fibers together when forming an assembly thereof.

Another object is to provide light-conducting fibers of the above character wherein said outer claddings are formed of material preselected to have a lower melting point than that of the remaining parts of the fibers so that a fused connection between each of a group of such fibers can be made without causing distortion of the core and inner cladding parts of said fibers.

Another object is to form said outermost claddings as well as the other parts of said fibers of glass material whereby, when an assembly of said fibers is made a composite glass structure will result having extreme rigidity and permanency.

Another object is to provide light-conducting fibers with double claddings of the above character wherein said outer cladding on each of said fibers is of sufficient volume in accordance with the cross-sectional size of the core and inner cladding parts of said fibers as to completely fill in all voids between said fibers when a plurality thereof are intimately grouped together and heated sufficiently to soften and cause said outer claddings to flow together in fused relation with each other.

Another object is to provide novel means and method of making a complete vacuum or air-tight fiber optical light-transferring glass structure which embodies a plurality of individually light-insulated light-conducting fibers permanently secured together in side-by-side relation with each other.

Another object is to provide means and method of making a structure of the above character completely of glass material without causing distortion of the initial cross-sectional configuration of the core and inner cladding parts of the fibers or in any way deterring the original light-transmitting properties of said fibers.

Another object is to provide novel means and method of making a secure and permanently vacuum-tight face plate embodying a plurality of substantially undistorted light-conducting fibers of circular cross-section disposed in adjacent side-by-side relation with each other.

Other objects and advantages of the invention will become apparent from the following description when taken in conjunction with the accompanying drawings in which:

FIG. 1 is a greatly enlarged longitudinal cross-sectional view of a light-conducting fiber of the type embodying the invention;

FIG. 2 diagrammatically illustrates a method of forming a glass assembly from which light-conducting fibers such as illustrated in FIG. 1 are subsequently drawn;

FIG. 3 is a diagrammatic illustration of an alternate method by which a similar glass assembly may be formed;

FIG. 4 is a side elevational view partly in cross-section of a glass assembly resulting from the practice of one or the other of the techniques illustrated by FIGS. 1 and 2;

FIG. 6 is a diagrammatic illustration of a preferred method of forming a light-transferring device from a plurality of fibers of the above type;

FIG. 7 is an enlarged fragmentary transverse cross-sectional view taken approximately on line 7—7 of FIG. 6;

FIG. 8 is a view similar to FIG. 7 illustrating a modified form of the invention;

Figure 5:
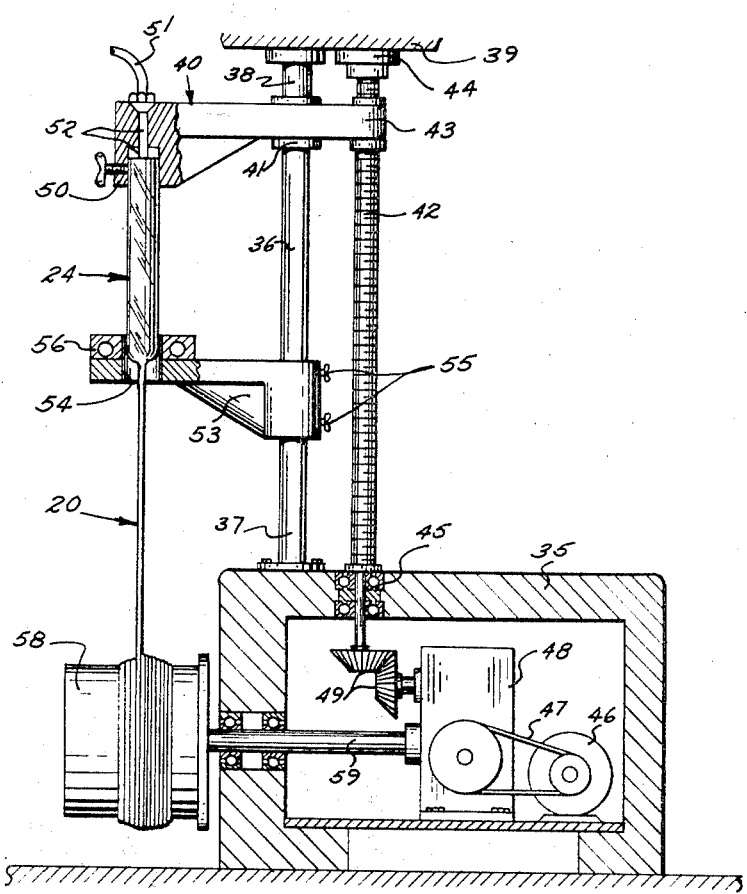
FIG. 5 is a diagrammatic illustration of means for forming a light-conducting fiber from an assembly such as shown in FIG. 4.

Referring more particularly to the drawings, it will be seen that the invention relates to the fabrication of doubly clad light-conducting fibers, such as shown in FIG. 1, and devices formed therefrom, such as shown in FIGS. 6–10, for example. The light-conducting fibers 20 of the invention (see FIG. 1) each embody, in their finished state, a core 21 of an optical glass having a relatively high index of refraction, a first or inner relatively thin cladding 22 surrounding said core 21 of a relatively low index of refraction and a second or outer cladding 23 of a glass material having a lower melting point than that of the above glasses and of a precontrolled thickness such as will be discussed hereinafter. The core 21 and inner cladding 22 parts of each of the fibers together serve as a light-conducting element adapted to transfer light by internal reflection through the fiber and the outermost cladding 23 basically serves as a glass flux adapted to ultimately form a matrix by means of which a plurality of fibers 20 may be joined together without distorting the initial cross-sectional shape of the core and inner claddings parts or in any way deterring the light-transmitting properties of the fibers.

The core 21 and inner cladding 22 parts of the fiber 20 are formed of glasses having indices of refraction so preselected as to provide the fiber 20 with a desired aperture or light-acceptance angle. The selection of glasses is made in the usual manner from the formula $\sin \mu$ equalling the square root of $n_1^2 - n_2^2$ wherein $\mu$ is the maximum aperture angle (see FIG. 1), $n_1$ is the index of refraction of the core and $n_2$ is the index of refraction of the cladding. As an example, an optical flint glass having an index of refraction of 1.75 might be used for the forming of the core 21 and a soda-lime glass or the like having an index of refraction of approximately 1.52 might be used in forming the inner cladding 22 giving the fiber in aperture angle $\mu$ of approximately 60°.

The outer cladding 23 is preferably formed of a glass or inorganic vitreous material preferably having a lower melting point than the glasses of the core and cladding parts 21 and 22 respectively for reasons which will become readily apparent hereinafter. For certain applications of use, it might be preferable to form the outer cladding 23 of a glass material having a certain preselected index of refraction and/or a specific color to provide light-absorbing means between a group of bundled fibers. However, when the outer cladding 23 is used solely as means to join a group of fibers together, as will be described hereinafter, its index of refraction is inconsequential. For most uses, lead containing glasses or commercially available powdered solder glass or the so-called "glass enamels" are preferred for use in forming outer claddings 23 of fibers 20.

In making a doubly clad fiber 20, a relatively large cylindrical glass assembly 24 (see FIG. 4) is initially formed and the fiber 20 is subsequently drawn from the assembly 24. One method of constructing an assembly 24 is illustrated diagrammatically in FIG. 2 wherein a uniformly dimensioned solid rod 25 of a preselected optical glass, having an index of refraction of that desired of the core part 21 of the fiber 20 is placed within a sleeve or tube 26 of glass of the index of refraction desired of the inner cladding 22 of the fiber 20. The wall thickness of the tube 26 is selected in accordance with the cross-sectional size of the rod 25 so as to cause the rod and tube assembly to be substantially equal, proportionately, to the ultimate relative core 21 to cladding 22 sizes desired of the fiber 20. The outer side surface of the tube 26 is completely coated with glass-like material 27 such as a commercial "glass enamel" or any powdered glass material or inorganic vitreous material having a lower melting temperature than that of the tube 26.

A preferred method of applying the coating 27 is to mix the powdered glass with water, pine oil or any suitable vehicle which is volatile or will burn off under temperatures which are used subsequently to fire the coating and secure it to the tube 26, as will be described presently. After having formed a paste-like mixture of glass powder, it is applied to the tube 26 with a brush 28, as shown (FIG. 2) or by dipping the tube 26 into the mixture while taking care to prevent the mixture from entering internally of the tube. Alternatively, the tube 26 may be rolled over a layer of the paste-like mixture, if desired. In any case, the coating 27 is controlled to be of a substantially uniform thickness in accordance with the amount of material needed to provide securing means for the fibers when making an assembly thereof, as will be described in more detail hereinafter.

With the paste-like coating of powdered glass thus applied to the tube 26, the tube 26, with or without the rod 25 therein, is placed in a conventional heating chamber, not shown, and fired by heating the same to a temperature of approximately 1050° F. for a time period of approximately one hour. The exact temperatures and time cycles for firing will, of course, vary somewhat for different types of glass powders which might be used. This fuses the coating 27 to the tube 26 and forms a contiguous glass cladding over the tube 26 to produce an assembly, such as shown in FIG. 4, when the rod 25 is within the tube 26.

Another method of preparing an assembly, such as shown in FIG. 4, is shown diagrammatically in FIG. 3 where, again, a rod 29 and tube 30 similar to the rod 25 and tube 26 are assembled by placing the rod 29 within the tube 30. In the present case, however, a second sleeve or tube 31 of low melting lead-containing glass or the like is fitted over the tube 30 to eventually become the outermost cladding 23 of the fiber 20 when the composite assembly of the rod 29 and tubes 30 and 31 are subsequently drawn to fiber size. The tube 31 is preselected to have a wall thickness proportionately controlled in accordance with the final thickness desired of the outer cladding 23 of the fiber 20 and is formed of a material having a lower melting temperature than the tube 30 and rod 29 combination.

By either of the two above-described methods, an assembly 24, such as shown in FIG. 4, can be formed wherein a core section 32 is surrounded by an inner cladding 33 having an outer cladding or tube 34, as the case may be, of glass material thereon. It is pointed out that the outer cladding 34 should have a melting point of from 50–100° F. lower than that of the inner cladding when both are at approximately the same conditions of fiber drawing viscosity.

After having formed a glass assembly 24 by one or the other of the techniques shown in FIGS. 1 and 2, the assembly 24 is heated to a fiber-drawing viscosity adjacent one of its ends and drawn to fiber size preferably with means such as shown diagrammatically in FIG. 5. While it is obvious that a fiber 20 may be drawn from an assembly such as 24 by hand or with many variations of the apparatus herein disclosed, it will be apparent that in order to produce a superior fiber 20 of uniform cross-sectional size throughout its length, the fiber should be drawn at a continuous uniform precontrolled rate in accordance with the size desired of the fiber while the assembly 24 is lowered substantially in the direction of drawing continuously at a uniform slower rate also controlled in accordance with the size desired of the fiber.

The apparatus of FIG. 5, which is shown for purposes of illustration, embodies a base 35 having a vertically extending column 36 thereon fastened at one end 37 to the base 35 and at its opposite end 38 to the ceiling 39 of a room in which the apparatus is used. Alternatively, the end 38 of the column 36 may be supported from the base 35 with suitable brackets or the like, not shown, if it is so desired. A slide 40 is mounted on the column 36 with suitable conventional bushing means 41 so as to permit the slide 40 to be movable along and guided by the column 36 by means of a rotatable lead screw 42 passing through an extension of the slide 40 in which the screw 42 is threadedly engaged. The lead screw 42 is supported in parallel relation with the column 36 by a socket-like connection 44 fastened to the ceiling 39 and bearing means 45 in the base 35. The slide 40 is moved along the column 36 by operation of a drive motor 46 which, by means of a belt and pulley arrangement 47 and conventional speed-reduction gearing within a gear box 48 along with interconnecting gears 49 between the reduction gearing and the lead screw 42, causes rotation of the lead screw 42. At the end of the slide 40 opposite to its connection with the lead screw 42, there is provided a clamp 50 in which one end of the glass assembly 24 is secured, as shown, and a vacuum line 51 from a conventional vacuum pump or the like, not shown, is provided to evacuate air or gases from between parts of the glass assembly during the fiber drawing operation. As shown diagrammatically, communication between one end of the assembly 24 and the vacuum line is made through openings 52 in the slide 40.

On the column 36, between the slide 40 and the base 35, there is provided a shelf-like bracket 53 having an opening 54 therethrough in substantially coaxial alignment with the glass assembly 24. The bracket 53 is clamped to the column with screws or the like 55 and provides means upon which a ring-like glass heating furnace 56 is supported. The furnace 56 may be of any well-known design preferably embodying a ring-like electrical heating element in approximately coaxial alignment with the opening 54 by means of which the material of the glass assembly 24 can be heated to a fiber-drawing viscosity when passed axially therethrough, as illustrated.

In operation, the slide 40 is initially positioned adjacent the uppermost end 38 of the column 36, substantially as shown, and the glass assembly 24 is clamped in place and lowered endwise into the furnace 56 by operation of the lead screw 42. It is pointed out that previous to the positioning of the assembly 24 in the apparatus, its end which is to be lowered into the furnace 56 is preferably heat-sealed to prevent the core and/or inner tubular parts of the assembly from slipping out of place before said parts are fused together by the heat of the furnace 56. The sealing of said end of the assembly also permits immediate evacuation of air from within the assembly through the vacuum line 51.

With the glass assembly 24 lowered into the furnace 56, as shown, the fiber 20 is drawn by gripping the depending end of the assembly and pulling the molten material thereof longitudinally away from the assembly at a rate controlled in accordance with the cross-sectional size desired of the fiber while simultaneously continually lowering the slide 40 to feed the assembly endwise into the furnace at a rate controlled in accordance with the rate of removal of the material of the assembly 24 resulting from the drawing of the fiber 20 therefrom.

The drawing of the fiber 20 may be started by simply placing a solid glass rod upwardly and endwise against the initially depending end of the assembly 24 to cause the glass rod to fuse to the glass assembly 24. When the glass rod has become well fused, it is drawn downwardly away from the assembly 24 pulling the material of the assembly 24 along with it thereby forming the fiber 20. The fiber is then broken away or cut from the glass rod and attached to drawing means such as the rotatable drum 58 shown in FIG. 5. The drum 58, which is supported on the base 35 by a shaft 59, is driven by the motor 46 through gearing in the gear box 48 at a predetermined speed of rotation in accordance with the selection of gears in the box 48 by which the shaft is rotated. It is pointed out that the relative rates of rotation of the lead screw 42 and drum 58 are precontrolled by the selection of proper gearing ratios within the box 48. It should also be understood that the particular drive means for the lead screw 42 and drum 58 which has been shown in FIG. 5 is purely diagrammatic and has been given for purposes of illustration only.

When the fiber 20 is drawn from the assembly 24, as described above, its relative proportions as to core and cladding sizes will remain substantially the same as the relative core to cladding sizes of the initial assembly 24 regardless of the minute size of only a few microns in diameter to which the fiber may be drawn. Furthermore, the fiber will retain substantially the same cross-sectional shape as that of the assembly 24.

In producing a fiber from an assembly 24 which was fabricated by the method illustrated in FIG. 2 wherein, for example, a rod 22 of optical flint glass having an index of refraction of approximately 1.75 and a sleeve or tube 26 of soda-lime glass coated with a glass powder or other similar inorganic vitreous material are used, the assembly would be heated to approximately 1500° F.–1600° F. for fiber-drawing purposes.

However, with an assembly 24 which was formed of a rod 29 of optical flint glass having an index of refraction of approximately 1.75 within a sleeve or tube 30 of soda-lime glass, both placed within an outer sleeve or tube 31 of a lead-containing glass having a melting temperature of approximately 50° F.–100° F. lower than that of the soda-lime glass when both are approximately at the same conditions of viscosity, said assembly would be heated to approximately 1640°–1680° F. for fiber-drawing purposes.

In all cases, the resultant fiber 20 will have the inner light-insulating cladding 22 (see FIG. 1) and the outer cladding 23, described hereinabove, by means of which a plurality of such fibers may be joined in fused intimate relation with each other without causing distortion of the core 21 and inner cladding parts 22 of the fibers.

A preferred method of forming a composite light-conducting device in accordance with this invention, from a plurality of doubly clad fibers 20, is to place a great number of said fibers longitudinally in a relatively large diameter, thin walled glass tube 60 such as shown in FIG. 6. The fibers 20 are preferably packed rather tightly in the tube 60 after having been bundled together and aligned in substantially parallel relation with each other by any known technique. Successful packing and pre-aligning of a bundle of fibers each of relatively small diameter has been accomplished by dipping the fibers in a liquid such as alcohol and withdrawing the same endwise from the liquid one or more times.

After having placed the fibers 20 in the tube 60 which is formed of a glass having a melting temperature within the range of that of the outermost coating glasses of the fibers themselves, the complete assembly is lowered gradually endwise through a heating chamber 61 and a vacuum is drawn at the uppermost end of the tube 60 to evacuate air and/or other gases from between the fibers 20 while simultaneously causing the tube 60 to collapse tightly around the fibers and force them into side-by-side engaging relation with each other, as shown by the magnified cross-sectional view of FIG. 7. The temperature used for the above collapsing operation for fibers 20 formed of the above-discussed combinations of glasses would be approximately between 1200° and 1300° F. In order to further assist in the compacting of the fibers 20 and to assure a complete air-tight seal between the fibers, it has been found that a slight pull or endwise drawing of the assembly of FIG. 6 as it is lowered through the heating element 61 produces excellent results.

Referring more particularly to FIG. 7, it will be seen that the net result of the above process is that of forming a composite integrally fused glass structure wherein the complete area between the individual core 21 and first cladding parts 22 of the fibers 20 is completely filled solidly with the glass material of the outermost claddings 23 thereof without causing distortion of the said core and first cladding parts of the fibers. In this way, round fibers 20 which, as discussed above, have superior light-transmitting properties, may be used to form light-conducting devices of the character shown in FIGS. 6 and 7.

From the above, it should be evident that control of the initial thickness of the outermost cladding 23 of the fibers will determine the proximity of the combined core 21 and first or inner cladding 22 parts of the fibers 20 in the final assembly of FIGS. 6 and 7. That is, by proper control of the thickness of the outer cladding 23 which ultimately becomes the glass matrix between the fibers, the fibers can be nested together in engaging side-by-side relation with each other, as shown in FIG. 7. Nevertheless, if it is desired to form an assembly such as shown in FIG. 8 wherein the core 21 and first or inner cladding parts 22 of the fibers are spaced from each other for special applications of use, a thicker outer cladding 23 on the initially formed fibers 20 and proper control of fusing temperature and time cycle will produce this result.

It is pointed out that assemblies of fibers 20, such as shown in FIGS. 6 and 7, may be made by other obvious methods or by a technique embodying the subject matter of Patent No. 3,193,363.

Fiber optical assemblies, such as shown in FIGS. 6, 7 and 8, have exceptional value in the forming of light-conducting face plates for pressurized or vacuumized articles such as cathode ray tubes, for example, wherein such face plates must be sufficiently rigid to avoid collapse under atmospheric or other pressures as well as being impervious to air or gases and resistant to chemical attack by certain gases or atmospheres within the tubes or the like.

Figures 9, 10:
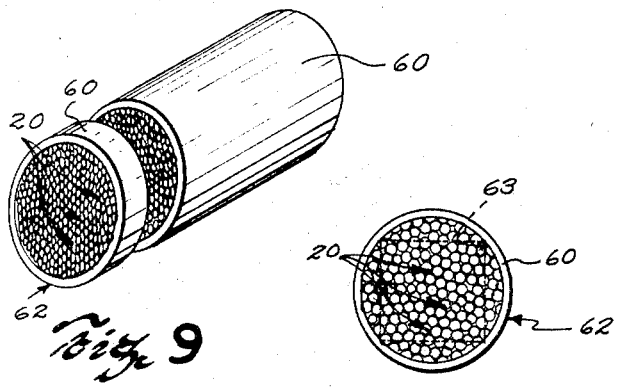
FIGS. 9 and 10 illustrate the forming of a light-transferring plate from a composite fused assembly of fibers of the above character.

In forming a face plate from an elongated assembly, such as shown in FIGS. 6, 7 and 8, the said assembly is simply cut, as shown in FIG. 9, in a direction normal to the axes of the fibers 20 and to a thickness approximately that desired of the face plate 62 to be formed therefrom. Thereafter, one or both sides of the plate 62 are optically ground and polished to render the cut ends of the fibers 20 highly receptive to light entering or leaving the same.

The face plate 62 may be used as is, with the outer surrounding glass tube 60, or cut along the dot-dash lines 63 of FIG. 10 to a square, hexagonal or any shape desired. This removes the glass tubular part 60.

Figure 11:
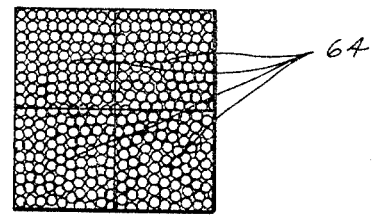
FIG. 11 illustrates the building of an enlarged face plate or the like from a plurality of smaller light-transferring plates such as shown in FIG. 10.

By cutting the face plate 62, as shown in FIG. 10, several such elements 64, see FIG. 11, may be edge-fused or otherwise secured together to form enlarged face plates. In all cases, the resolution which can be expected when face plates of the above character are used to transfer optical images is dependent upon the fineness of the individual fiber 20 sizes which can be controlled, as described above in the initial fiber-drawing operation of FIG. 5, or by grouping a plurality of fibers, as shown in FIG. 6, without the tube 60 and redrawing said grouping to reduce the fiber element size thereof before proceeding with the steps illustrated by FIGS. 6–11.

From the foregoing, it will be seen that efficient and economical means and method have been provided for accomplishing all of the objects and advantages of the invention. Nevertheless, it is apparent that many changes in the details of construction, arrangement of parts or steps in the process may be made without departing from the spirit of the invention as expressed in the accompanying claims and the invention is not to be limited to the exact matters shown and described as only the preferred matters have been given by way of illustration.

We claim:

1. The method of making glass clad energy-conducting fibers for use as long and thin individually insulated energy-conducting guides in devices formed of fused bundles thereof, each fiber having a glass cladding adapted to serve as an insulating medium for preventing energy being conducted through the fiber from passing outwardly through the sides thereof and an outer layer of glass on said cladding adapted to serve as a medium for connecting the fibers together in such devices, said method comprising the steps of placing a rod of energy-conducting material within a tube formed of said glass cladding material, surrounding said tube with a layer of glass having a substantially lower melting temperature than the glass of said tube, heating the combination to a temperature sufficient to render all parts thereof fusible to each other and capable of being drawn as a unit, drawing from one end of the heated combination a long and thin unitary strand having the cross-sectional size desired of said fibers and cutting said strand transversely at a number of spaced points therealong to form said fibers.

2. The method of making glass clad energy-conducting fibers for use as long and thin individually insulated energy-conducting guides in devices formed of fused bundles thereof, each fiber having a glass cladding adapted to serve as an insulating medium for preventing energy being conducted through the fiber from passing outwardly through the sides thereof and an outer layer of glass on said cladding adapted to serve as a medium for connecting the fibers together in such devices, said method comprising the steps of placing a rod of energy-conducting material within a tube formed of said glass cladding material, surrounding said tube with a substantial thickness of powdered glass having a substantially lower melting temperature than the glass of said tube and causing said powdered glass to become fused to said tube during one stage of the method, heating the combination to a temperature sufficient to render all parts thereof fusible to each other and capable of being drawn as a unit, drawing from one end of said heated combination a long and thin unitary strand having the cross-sectional size desired of said fibers and cutting said strand transversely at a number of spaced points therealong to form said fibers.

3. The method of making an energy-conducting device comprising the steps of providing a number of long and thin individually glass clad energy-conducting elements comprising the steps of providing a number of long and thin fibers each having a core of energy-conducting material surrounded by a cladding of glass having approximately the same melting temperature as said core and an outer surrounding layer of glass on said cladding having a substantially lower melting temperature than said cladding glass, said core, cladding and layer of glass all being fused together as an integral unit, bundling said fibers together in side-by-side relationship with each other and heating said bundle to a temperature sufficient to cause said outer layers of glass to melt and fuse together as an integral connecting medium between said fibers.

4. The method as recited in claim 3 wherein said bundle is heated to a temperature below the melting temperature of said core and cladding materials of said fibers to prevent deformation thereof during fusion of said outer layers of glass.

5. The method of making an energy-conducting device comprised of a unitary bundle of fused together long and thin individually glass clad energy-conducting fibers each having a glass cladding adapted to serve as an insulating medium for preventing energy being conducted through the fibers from passing outwardly through the sides thereof and an outer layer of glass on said cladding adapted to serve as a medium for connecting the fibers together in said device, said method comprising the steps of placing a rod of energy-conducting material within a tube of glass cladding material, surrounding said tube with a layer of glass having a substantially lower melting temperature than the glass of said tube, heating the combination sufficiently to render all parts thereof fusible to each other and capable of being drawn as a unit, drawing from one end of the heated combination a long and thin unitary strand having the cross-sectional size desired of said fibers and cutting said strand transversely at a number of spaced points therealong to form said fibers, bundling said fibers together in side-by-side relationship with each other and heating the bundle to a temperature sufficient to cause said outer layers of glass to melt and fuse together as an integral connecting medium between said fibers.

References Cited by the Examiner
UNITED STATES PATENTS

| | | | |
|---|---|---|---|
| 1,420,996 | 6/1922 | Frank | 65—60 |
| 2,608,722 | 9/1952 | Stuetzer. | |
| 2,619,438 | 11/1952 | Varian et al. | |
| 2,668,783 | 2/1954 | Migley | 65—60 X |
| 2,752,731 | 7/1956 | Altosaar. | |
| 3,148,967 | 9/1964 | Hicks | 65—4 |

OTHER REFERENCES

Nature: No. 4392, Jan. 2, 1954, p. 39, article entitled, "A New Method of Transporting Optical Images Without Aberrations."

DONALL H. SYLVESTER, *Primary Examiner.*

F. W. MIGA, *Assistant Examiner.*